(12) United States Patent
Amir

(10) Patent No.: US 9,298,958 B1
(45) Date of Patent: Mar. 29, 2016

(54) SYSTEM AND METHOD OF ENHANCED RTLS FOR IMPROVED PERFORMANCE IN WIRELESS NETWORKS

(71) Applicant: Centrak, Inc., Newtown, PA (US)

(72) Inventor: Israel Amir, Newtown, PA (US)

(73) Assignee: CENTRAK, INC., Newtown, PA (US)

( * ) Notice: Subject to any disclaimer, the term of this patent is extended or adjusted under 35 U.S.C. 154(b) by 408 days.

(21) Appl. No.: 13/875,379

(22) Filed: May 2, 2013

Related U.S. Application Data

(60) Provisional application No. 61/687,837, filed on May 2, 2012.

(51) Int. Cl.
| | |
|---|---|
| H04Q 5/22 | (2006.01) |
| H04W 52/02 | (2009.01) |
| G06K 7/01 | (2006.01) |
| H04W 88/08 | (2009.01) |
| G06K 7/10 | (2006.01) |

(52) U.S. Cl.
CPC ................. G06K 7/10009 (2013.01)

(58) Field of Classification Search
CPC .......... H04Q 5/22; H04W 52/02; G06K 7/01
USPC ........ 340/10.1–10.5, 572.2, 825.49; 455/517; 370/311, 310, 338
See application file for complete search history.

(56) References Cited

U.S. PATENT DOCUMENTS

| | | | | |
|---|---|---|---|---|
| 7,315,533 | B2 * | 1/2008 | Theobold et al. | 370/338 |
| 7,423,535 | B2 * | 9/2008 | Chung et al. | 340/572.4 |
| 7,815,042 | B2 * | 10/2010 | Oishi | 198/837 |
| 7,830,850 | B2 * | 11/2010 | Twitchell, Jr. | 370/338 |
| 2005/0242188 | A1 * | 11/2005 | Vesuna | 235/462.46 |
| 2007/0236334 | A1 * | 10/2007 | Borovoy et al. | 340/10.2 |
| 2012/0155349 | A1 * | 6/2012 | Bajic et al. | 370/311 |
| 2012/0258756 | A1 * | 10/2012 | Pixley et al. | 455/517 |
| 2012/0268250 | A1 * | 10/2012 | Kaufman et al. | 340/10.1 |

* cited by examiner

*Primary Examiner* — Nam V Nguyen
(74) *Attorney, Agent, or Firm* — Maldjian Law Group LLC

(57) ABSTRACT

A wireless active RFID tag, system and method, the system including: a plurality of access points, wherein each access point is groupable by a characteristic in common with another access point; a system controller communicatively coupled to a system memory and to the plurality of access points; and an active RFID tag, the tag comprising: a transmitter module configured to transmit, to access points in the system, request for an acknowledgement from any member of a predetermined group of access points. The acknowledgement may further include one or more of a time reference used by the system; and an identification of secondary technologies used by the system.

78 Claims, 6 Drawing Sheets

200

Distribution of IDs to APs based on the Location in a single Channel System

300

Distribution of IDs to Aps based on the Frequency Channel

400

Unified Timing Distribution to APs

500

550

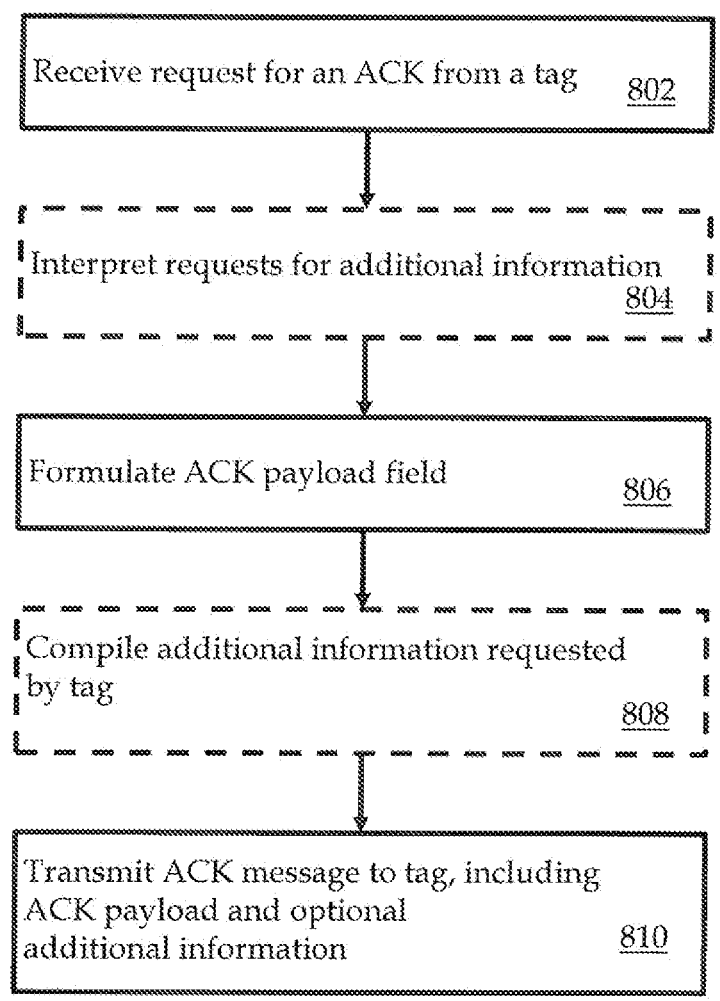

SYSTEM AND METHOD OF ENHANCED RTLS FOR IMPROVED PERFORMANCE IN WIRELESS NETWORKS

CROSS-REFERENCE TO RELATED APPLICATIONS

This application claims the benefit of U.S. Provisional Patent Application Ser. No. 61/687,837, filed on May 2, 2012, the entire content of which is hereby incorporated by reference in its entirety.

BACKGROUND

1. Field of the Invention

Embodiments in accordance with the present invention relate to methods and systems for sensor data reporting with high positional accuracy and low power consumption.

2. Description of Related Art

Automatic wireless monitoring is prevalent in a variety of industries where location and other characteristics of a product or environment must be closely monitored for safety or regulatory reasons, such as hospitals. Other environmental parameters may also be important due to the nature of what items or processes (e.g., manufacturing processes) are being monitored. For example, humidity, exposure to light, motion sensors, positional location within a predetermined area, orientation of the product (e.g., whether or not it is upright), etc. may be important.

In many such places a facility is already wired with a communication infrastructure, particularly a Wi-Fi infrastructure, and wireless monitoring is achieved by connecting appropriate sensors with small Wi-Fi transceivers (i.e., tags) that can transmit the measured parameter(s) to a central server, which in turn distributes the measurements to applications that need to monitor the parameters. Although standard Wi-Fi provides bi-directional communication, standard Wi-Fi uses power relatively inefficiently. Consequently, a battery-operated standard Wi-Fi transceiver must use large and/or heavy batteries, or the batteries must be replaced relatively frequently. A variation of the Wi-Fi protocol that uses one directional communication from the tag to the Access Points is used by a few Wi-Fi infrastructure providers. This protocol is much more power efficient as it does not require association between the tags and the Access Points for communication. An example of such a protocol is the CCX protocol that, while using the Wi-Fi Physical layer and MAC structure, is not a conventional Wi-Fi packet that is IP based and as such requires 2-D communication between the Access Points (AP) and the tags. Other one-directional systems such as Aruba™ are also known.

Indoor Real-Time Location Systems ("RTLS") have gained popularity and are a mainstream product now. RTLS is especially popular in the healthcare industry for a variety of applications ranging from asset tracking through patient and staff tracking, environmental or patient sensing (e.g., temperature), hygiene compliance, elopement (i.e., a patient leaving a facility without authorization), theft prevention, and so forth.

Major drawbacks of using conventional Wi-Fi-based RTLS technology include:

First, tags (i.e., the mobile portion of the system) use relatively high power consumption. The high power consumption is inherent to Wi-Fi technology because Wi-Fi is ordinarily targeted for high-bandwidth applications. Support in conventional Wi-Fi for large bandwidth results in peak and average power requirements that are much larger than competing 900 MHz and 433 MHz technologies.

Second, although usage of one-directional CCX tag transmission helped reduce somewhat the power consumption, with CCX there is no back channel from the server to the Wi-Fi tags. Lack of a back channel prevents realization of benefits arising from being able to communicate back to the tag for network-type information that would allow the tag better utilize its resources as well as possible parameters changes. Although bi-directional communication may be implemented by assigning Internet Protocol ("IP") addresses to the tags and using standard Wi-Fi protocols, such an implementation is known to be highly power consuming.

Cisco™ Compatible Extensions ("CCX") are a vendor-developed standard designed and promulgated for Cisco Wi-Fi networks. A CCX-based system is used in Cisco Wi-Fi-based Real-Time Location Systems ("RTLS"). A CCX-compatible tag transmits one-directional packets with a flexible format that is recognized by Access Points ("APs") using a predefined header. The APs transmit the packet with other support information, such as a received signal strength indicator ("RSSI"), to a Cisco mobility services engine ("MSE") that uses the information from multiple APs to calculate location using triangulation. A CCX-based system presents an advantage over the standard bi-directional Wi-Fi communication because, first, the CCX-based system does not require for the tag to have an IP address. Second, one-directional communication substantially reduces power consumption by the tag.

Although a CCX-based system is adequate to support position location using triangulation methods, it is not adequate by itself to support position location methods having greater positional accuracy, such as those used in new generations of RTLS systems.

However, a first problem with using new generations of RTLS technology with a CCX-based system is tag power consumption. New generations of RTLS systems utilize secondary technologies such as infrared ("IR"), low-frequency RF ("LF") or ultrasound ("US"). The secondary technologies are needed to provide a higher level of positional resolution that cannot be provided by triangulation alone. However, the secondary technologies consume additional power from the tags, thereby further burdening conventional Wi-Fi tags that already suffer from relatively poor power consumption.

One way to make the secondary technologies on the tag consume less power is through the use of synchronization, as disclosed in U.S. Pat. No. 8,139,945 ("the '945 Patent"), the entire content of which is hereby incorporated by reference in its entirety. Improved synchronization allows a tag to activate certain circuitry only when it may be needed. In the '945 Patent, in order to synchronize the end devices (i.e., tags and exciters), there must be a return link back from the system (e.g., an AP) to the end devices. The conventional CCX protocol is incapable of supporting the return link because the CCX protocol is one-directional.

A second problem arising from the lack of backward channel in CCX-based system is an inability to gain important performance enhancement to the RTLS resolution. One such enhancement is the use of virtual walls ("VWs") as disclosed in U.S. Pat. No. 8,018,584 ("the '584 Patent"), the entire content of which is hereby incorporated by reference in its entirety.

Therefore, a need exists to substantially reduce the power consumption of Wi-Fi based tags and to help substantially improve the system positional accuracy, in particular the system positional accuracy when used in conjunction with secondary technologies such as Infrared, LF and/or Ultrasound.

SUMMARY

Embodiments in accordance with the present invention include wireless active RFID tag, system and method, the system including: a plurality of access points, wherein each access point is groupable by a characteristic in common with another access point; a system controller communicatively coupled to a system memory and to the plurality of access points; and an active RFID tag, the tag comprising: a transmitter module configured to transmit, to access points in the system, request for an acknowledgement from any member of a predetermined group of access points. The acknowledgement may further include one or more of a time reference used by the system; an identification of communication channels used by the system; and an identification of secondary technologies used by the system.

A method in accordance with an embodiment of the present invention may include: receiving, by an access point of a communication system, a request message from an active RFID tag for an acknowledgment message, wherein the communication system is substantially single-directional from the RFID tag to the access point; formulating an acknowledgment message in response to the request message; and transmitting the acknowledgment message from the access point to the active RFID tag.

An active RFID tag in accordance with an embodiment of the present invention may include: a position sensor; and a transmitter module configured to transmit to an access point: a request for an acknowledgement from a member of a predetermined group of access points.

Embodiments in accordance with the present invention may be described using the Cisco™ Wi-Fi methodology known in the art. However, embodiments are not limited to operation with a specific networking communication vendor. Instead, embodiments also are usable with networking communication products from other vendors that provide protocols similar to that used by Cisco.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 8 is a diagram depicting at a high level of abstraction a method in accordance with another embodiment of the present invention.

Figure 1A:
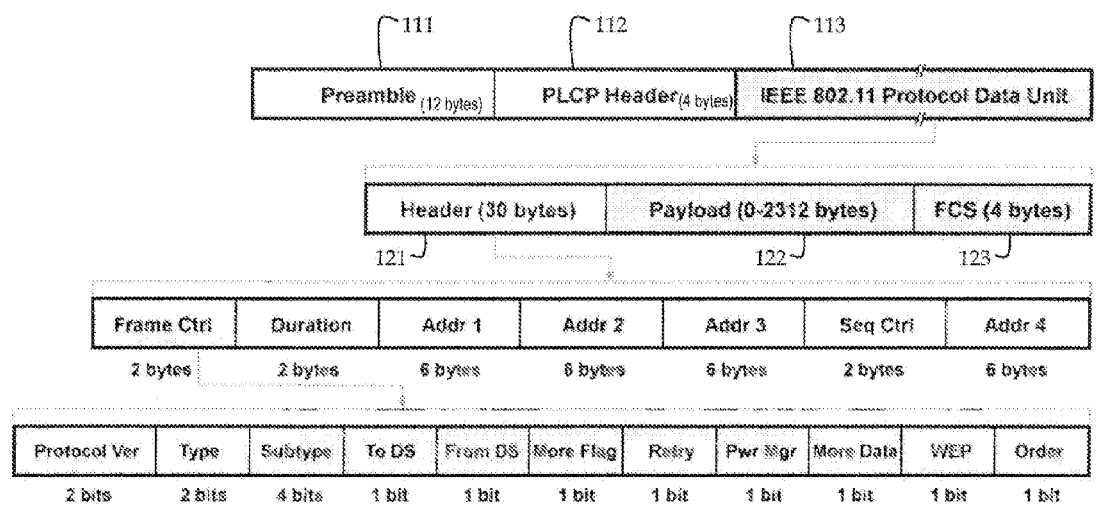
FIG. 1A is a diagram of an IEEE 802.11 header as known in the art.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize location sensors and other sensors (e.g., temperature and humidity) that communicate with a central monitor.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "Wi-Fi" or "conventional Wi-Fi" refers generally to a bi-directional radio communication technology that operates based on one or more of the Institute of Electrical and Electronics Engineers ("IEEE") 802.11 family of standards, which are incorporated herein by reference. The IEEE 802.11 standards specify the RF and protocol characteristics of a bi-directional radio communication system.

As used herein, the terms "CCX" or "Cisco CCX" or "CCX-compatible Wi-Fi" refer generally to "Cisco™ Compatible Extensions Program for Wi-Fi Tags." This provides a middleware that allows users of Cisco-compatible network equipment to benefit from extensions developed by third-party developers. Consistency and interoperability are improved by having third-party developers develop extensions that are verified to interoperate with the CCX middleware. Systems from other vendors that are similar to CCX may be referred to herein as "CCX-compatible" systems. CCX-compatible systems generally provide a one-directional communication protocol.

As used herein, the term "module" refers generally to a logical sequence or association of steps, processes or components. For example, a software module may comprise a set of associated routines or subroutines within a computer program. Alternatively, a module may comprise a substantially self-contained hardware device or circuit device. A module may also comprise a logical set of processes irrespective of any software or hardware implementation.

As used herein, the term "transmitter" may generally comprise any device, circuit, or apparatus capable of transmitting an electrical, electromagnetic, infrared, ultrasonic, or optical signal. As used herein, the term "receiver" may generally comprise any device, circuit, or apparatus capable of receiving an electrical, electromagnetic, infrared, ultrasonic, or optical signal. As used herein, the term "transceiver" may generally comprise any device, circuit, or apparatus capable of transmitting and receiving an electrical, electromagnetic, infrared, ultrasonic, or optical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1A illustrates an IEEE 802.11 frame format 100 as known in the art. Frame format 100 may be divided into a twelve-byte preamble field 111, a four-byte physical layer convergence procedure ("PLCP") header field 112, and a variable-length protocol data unit ("PDU") field 113. PDU field 113 may be further subdivided into a thirty-byte header field 121, a variable-length payload field 122, and a four-byte frame check sequence ("FCS") field 123. Payload field 122 may vary in length between zero and 2,312 bytes. Therefore, the minimum length for frame format 100 is fifty bytes when the payload field 122 is of zero length.

Figure 1B:
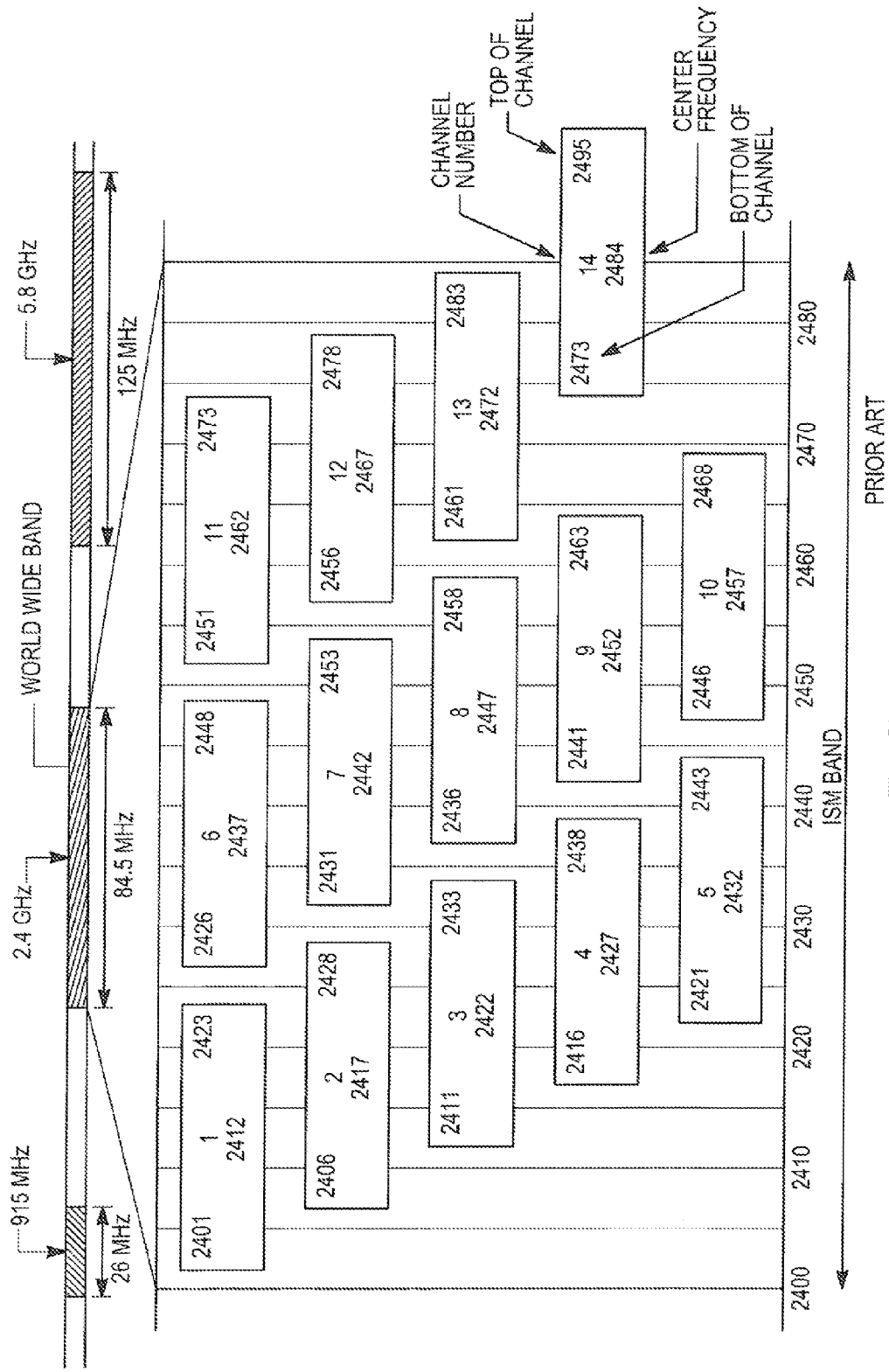
FIG. 1B is a diagram of frequency assignments for IEEE 802.11 channels as known in the art.

FIG. 1B illustrates frequency assignments for IEEE 802.11 channels as known in the art. Certain combinations of channels form independent, non-overlapping frequency groups, e.g., channels 1, 6 and 11. In order to reduce spectral interference among different tags, tags in accordance with an embodiment of the present invention may be designed to operate only among a group of three Wi-Fi channels that form a non-overlapping frequency group, e.g., channels 1, 6 and 11.

FIG. 1A, FIG. 1B and CCX are used herein to illustrate various embodiments in accordance with the present invention. However, embodiments are not limited to CCX and/or the conventional Wi-Fi frame format or frequency assignment. Instead, embodiments in accordance with the present invention may be adapted to use other frame format and/or frequency assignment in order to send messages as described herein.

Embodiments in accordance with the present invention provide an enhanced CCX ("ECCX") protocol to address the shortcomings of the known art. The enhanced CCX protocol is based upon the CCX protocol as supplemented by a message field in the data message (e.g., a field in a header or elsewhere in a message packet) that sends a request for an acknowledgment signal ("ACK") from at least one Wi-Fi access point ("AP"). A system in accordance with an embodiment of the present invention may include APs that are configured to receive and act upon these data messages. The AP is designed to transmit an ACK upon receiving an ECCX message. The APs may be numbered in one of several possible ways. In one embodiment, the tag in its default state may transmit on one of three independent, non-overlapping Wi-Fi channels (e.g., channels 1, 6 and 11). In general, the approach may be extended to any number of channels supported by IEEE 802.11.

Other wireless networking vendors (e.g., Aruba™) may offer one-directional networking protocols that are similar to CCX and use the Wi-Fi physical layer. Persons of skill in the art will recognize how to adapt the embodiments herein to various other vendors' one-directional networking protocol systems. Embodiments described herein are not limited to usage with a particular vendor's one-directional networking protocol system.

In some embodiments in accordance with the present invention, a tag may be an active RFID tag. An active RFID tag uses an internal power source (e.g., a battery) within the tag to continuously power the tag and its RF communication circuitry. In contrast, passive RFID relies on RF energy transferred from a reader to the tag to power the tag. Active RFID allows relatively low-level signals to be received by the tag, and the tag can generate relatively high-level signals back to the access point. Active tags may also initiate communication with an access point or other tags.

Figure 2:
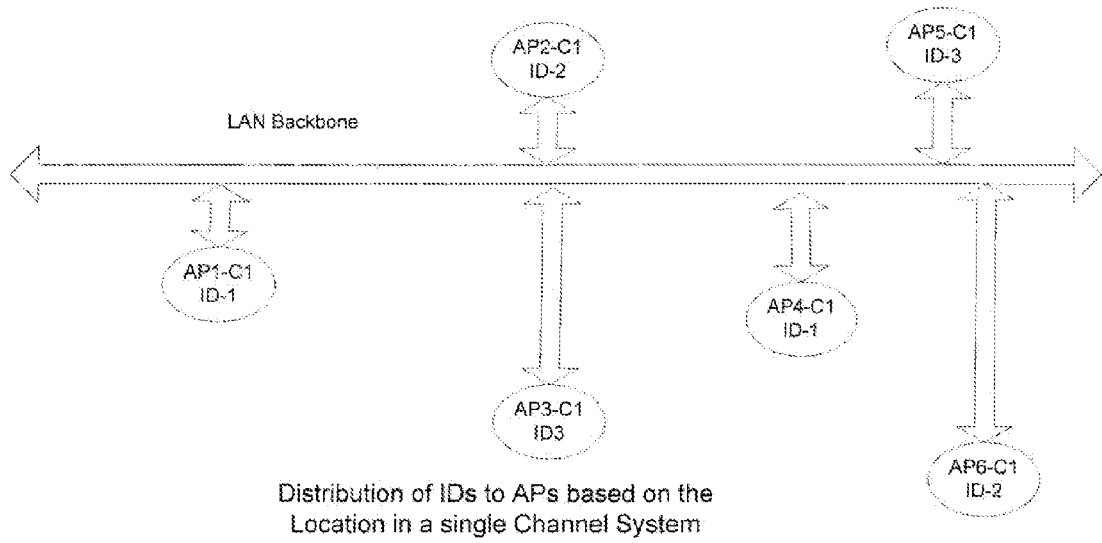
FIG. 2 depicts distribution of IDs to APs based upon the AP location in a single-channel system, in accordance with an embodiment of the present invention.

Referring now to FIG. 2, there is illustrated an exemplary system layout 200 of APs in accordance with an embodiment of the present invention. Layout 200 shows an approximate physical relationship among APs (e.g., that AP1 may be closest to AP2 and/or AP3, but may be relatively farther from AP5 and AP6), interconnected as illustrated by a LAN backbone. FIG. 2 is not drawn to scale. Layout 200 illustrates a configuration in which each AP is configured to use one Wi-Fi channel (illustrated as "C1"). Furthermore, each AP is assigned a reusable ID. The AP ID may be reused for APs that are relatively widely separated. For example, as illustrated the IDs among AP1, AP2 and AP3 are unique, but AP4 (being relatively farthest from AP1) reuses the ID assigned to AP1. Layout 200 may be useful when there is increased RF isolation between APs, for instance if the APs are widely separated, or are located in enclosed rooms or different floors, etc.

Figure 3:
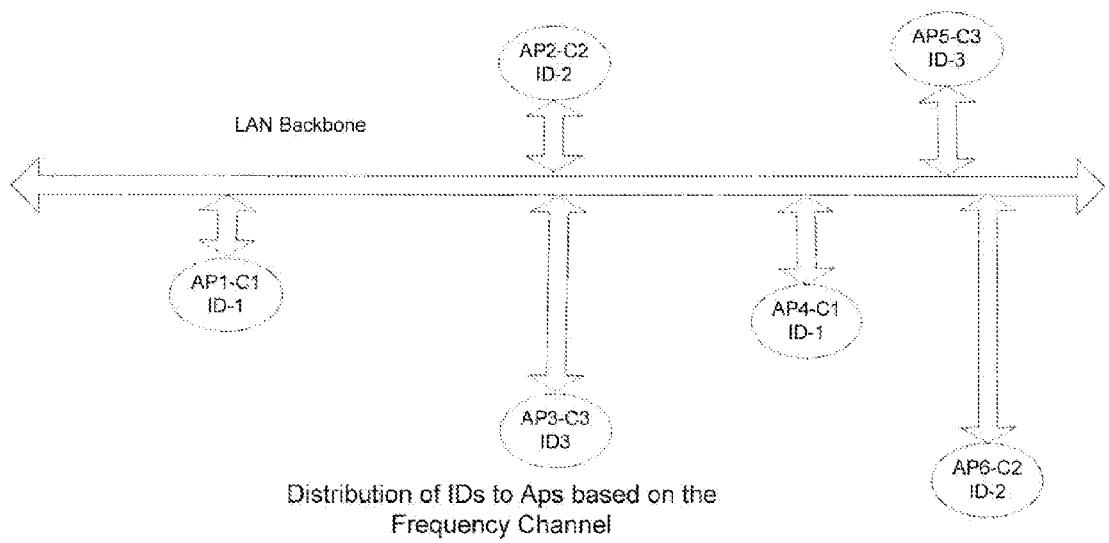
FIG. 3 depicts distribution of IDs to APs based upon the frequency channel, in accordance with another embodiment of the present invention.

Referring now to FIG. 3, there is illustrated an exemplary system layout 300 of APs in accordance with another embodiment of the present invention. Similar to FIG. 2, layout 300 shows an approximate physical relationship among APs (e.g., that AP1 may be closest to AP2 and/or AP3, but may be relatively farther from AP4, AP5 and AP6), interconnected as illustrated by a LAN backbone. FIG. 3 is not drawn to scale. Layout 300 illustrates a configuration in which each AP ID is configured to use one Wi-Fi channel selected from a group of non-overlapping Wi-Fi channels. In layout 300, the group of non-overlapping Wi-Fi channels is illustrated as C1, C2 and C3, and each AP is assigned a Wi-Fi channel selected from among this group. For example, AP1 is assigned C1. AP2 and AP3, being relatively close to AP1, are assigned C2 and C3, respectively. AP4, being relatively farther from AP1, reuses C1. Similarly, AP5 and AP6 reuse C3 and C2, respectively. AP IDs are reused in a manner similar to that of layout 200. Layout 200 may be useful when there is less RF isolation between APs, for instance if the APs are more closely separated compared to layout 200. Compared to layout 200, layout 300 uses channel selection in a way that tends to increase wireless isolation between possible responding APs.

Assigning and reusing AP IDs as illustrated in layout 200 and/or layout 300 may be helpful when locating a tag, so that the AP IDs may be understood by the tag without knowing where it is. For example, layout 300 provides a system in which the spatial relationships between the APs are known. If a tag asks for an ACK from APs with ID-1, it is likely that there will be at most one response from an AP. If no ACK is received, a collision may have occurred, in which case a collision avoidance process such as backoff may be used.

In both layout 200 and layout 300, reusable IDs may be assigned to APs in a way that maximizes the minimum wireless distance between APs that share the same ID. Wireless distance in this context refers to the RF attenuation between an AP and a tag. For example, if a wall separates a tag from an AP, the wireless distance between the tag and the AP may be greater than the physical distance between them. For an obstructed path having a predetermined RF attenuation, the wireless distance may refer to a length of a line-of-sight path having substantially the same RF attenuation.

Layout 200 and/or layout 300 may be used with packet collision avoidance processes as known in the art. For example, one or more APs under control of a controller may implement a random backoff process, even for a first response.

Figure 4:
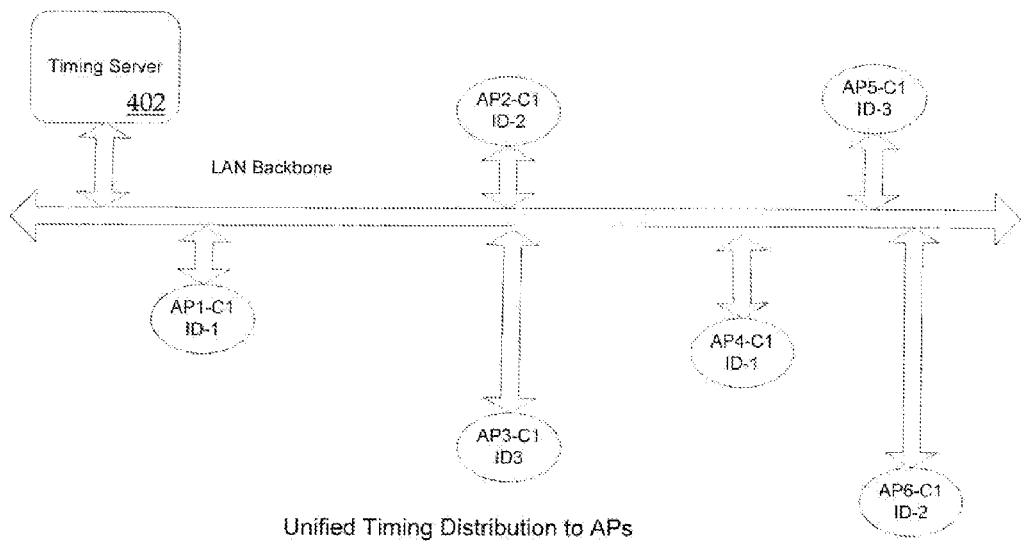
FIG. 4 depicts unified timing distribution to APs, in accordance with another embodiment of the present invention.

Referring now to FIG. 4, there is illustrated an exemplary system layout 400 of APs in accordance with an embodiment of the present invention. Layout 400 is similar to layout 200, with the addition of timing server 402. Timing server 402 may be used to provide clock information to all APs. In some embodiments, the APs may periodically request timing information from timing server 402 in order to facilitate timing synchronization among APs. In other embodiments, timing server 402 may send timing information to one or more APs by way of a push message. A push message is a message that is sent without an explicit request from the recipient. A push message may be sent on a predetermined schedule or upon detection by the sender of a predetermined system status, and so forth.

Some facilities may use a hybrid approach to assigning AP channels and IDs. For example, sections of a facility that are densely populated with APs may adopt a layout similar to layout 300, while less densely populated sections of the facility may adopt a layout similar to layout 200, In one embodiment of the current invention, one or more APs may be configured such that they do not respond to signals from tags when a signal received by an AP is below a predetermined threshold of RSSI, e.g., −75 dBm.

For most secondary technologies (e.g., US, LF or IR), a resynchronization every one to five minutes may facilitate substantial improvement in power consumption. The resynchronization may be needed only when the tag is active.

In one embodiment, the tag while in motion, or after it wakes up from a sleep state, may send periodic ECCX packets that include a request for an ACK from the system. Not all ECCX packets necessarily include a request for an ACK. A request for an ACK may be sent on a fixed schedule (e.g., once every 5 minutes), or on an adaptive schedule that depends upon the state of the tag (e.g., once per minute if in motion, otherwise once every 10 minutes; or more/less often if certain secondary technologies are detected), and so forth. An AP that receives the request will respond to the tag if the following two conditions are met:

First, the AP ID in the packet header matches the ID of an AP, which helps to reduce collisions; and Second, the RSSI level is above a threshold set by the system.

In some situations, more than one AP with a matching ID address may have sufficient RSSI to respond. For example, suppose there are two such APs. In this case, both of the APs would respond, and the reply from both APs may collide and cause an erroneous packet reception by the tag, causing the erroneous packet to be discarded. In this case, the tag will attempt a second ECCX message using a second AP ID, and will listen for an ACK. There remains a remote possibility that a second pair of APs matching the second AP ID also will be in range to receive the tag signal above the threshold. If there is such a collision from the second pair of APs, then the tag will try to achieve an ACK from APs configured to use the third group of IDs. In some embodiments, if no APs in range can support the minimum RSSI value, the tag may transmit a request for an ACK from any receiving APs without the RSSI constraint. In some embodiments, if the tag senses collisions, then the tag may request a higher minimum RSSI value as part of the request for an ACK.

There are at least two types of synchronizations that can benefit from the use of the secondary technologies: "loose" synchronization and "tight" synchronizations.

Loose synchronization may be useful for tags that are actively using certain secondary technologies, e.g., a secondary technology that consumes relatively less tag battery power to operate. Because less power is used, a looser synchronization and a resultant greater time that the related circuitry is active may be tolerated for a predetermined level of energy drain from the tag battery.

In some embodiments, there may be a need to resynchronize at a periodic rate, e.g., every 300 seconds. A synchronization period would be the time interval between consecutive resynchronizations. When performing loose synchronization, initial attempts may start before an end of the synchronization period (e.g., at 200 seconds into a 300-second synchronization period) in order to give ample time for the tag to receive an ACK from the system.

Tight synchronization typically is used when a system application requires more precise localization. For example, localization in the presence of a virtual wall may benefit from tight synchronization. Tight synchronization is generally understood to provide a synchronization error of no more than about 10 mS to about 100 mS.

Figure 5A:
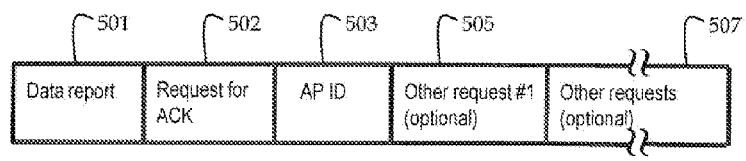
FIG. 5A depicts a layout of a PDU field configured to request an ACK in accordance with an embodiment of the present invention.

FIG. 5A illustrates an exemplary format 500 for use in a message from a tag to an AP. Format 500 may be useful to define all or part of payload field 122 illustrated in FIG. 1, but it should be understood that the message format is not limited in this regard, and that substantially any data format supported by the communication apparatus may be used to pass data from a tag to an AP. Format 500 is not drawn to scale with respect to the length of the various data fields. Format 500 may include a field 501 used to report a data measurement by the tag. Format 500 may further include a field 502 used to request an ACK from the AP. Format 500 may further include a field 503 used to specify the AP ID of the AP that should respond with the ACK. Format 500 may further include one or more fields 505 and 507 to make additional requests of the AP or of the system. Various data fields may be passed in a single message as illustrated in FIG. 5A, or may be passed in a series of messages. Persons of skill in the art will recognize how to add additional fields or to define format 500 in a different order, and so forth.

Figure 5B:
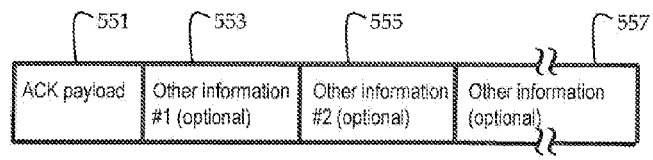
FIG. 5B depicts a layout of an ACK message in accordance with an embodiment of the present invention.

FIG. 5B illustrates an exemplary ACK message format 550 for use in an ACK to a tag from an AP whose ID matches the AP ID specified in field 503. ACK message format 550 is not drawn to scale with respect to the length of the various data fields. ACK message format 550 may include an ACK payload field 551 used to fulfill the request for an ACK by the tag. ACK message format 550 may further include one or more fields such as fields 553, 555 and 557 used to send certain information to the tag, i.e., information that may have requested by the tag in fields 505 and/or 507. Various data fields may be passed in a single message as illustrated in FIG. 5B, or may be passed in a series of messages. Persons of skill in the art will recognize how to add additional fields or to define ACK message format 550 in a different order, and so forth.

In some embodiments, fields 553-557 in the ACK message format 550 may include one or more of the notifications listed below. When the tag receives a message conforming to the ACK message format 550, information in fields 553-557 may be decoded so that the tag may take further action as deemed necessary.

First, one or more of fields 553-557 may include a universal clock reference. The universal clock reference may include a time of origin or other unified clock reference that end device may use for synchronization. End device synchronization may help substantially reduce power consumption and allow for an increase in update rate as disclosed in the '945 Patent. Synchronization also allows for a relatively easy way to create virtual walls. VW technology, in general, facilitates high resolution positional accuracy and improved bleeding performance at boundaries of virtual walls. Bleeding is an undesirable phenomenon at a boundary of virtual walls, in which a tag located very close to a virtual wall has a nonzero probability of being detected as located on the other side (i.e., the wrong side) of the virtual wall.

Second, one or more of fields 553-557 may include a listing of channels used by the system, e.g., that only channel 1 is being used by the system. The channel listing may allow the tag to avoid transmitting on unused channels, and/or transmit only using frequencies used by the system. Avoiding transmitting on unused channel may help save up to 67% battery life. For example, if APs use a layout as shown in FIG. 2, then tags need to transmit only on channel 1 and do not need to transmit on channels 6 or 11.

Third, one or more of fields 553-557 may include an indication of the type of RTLS system employed. For example, if the RTLS system does not implement or utilize a feature such as the Low Frequency Exciters, one or more of fields 553-557 may include this notification. The tag may then configure its internal state (e.g., set a flag) such that the tag may avoid powering circuitry devoted to the unavailable features, thus saving power. Similarly, if the RTLS system does not use IR exciters, then IR circuitry in the tag may be shut off.

Fourth, one or more of fields 553-557 may include a command directed to a predetermined tag. The command may be addressable to the tag's MAC address, or a like addressing scheme.

Fifth, one or more of fields 553-557 may include a command directed to a group of tags. Membership of a tag in a group of tags may be preprogrammed at time of manufacture, or may be programmed or reprogrammed during operation by a previous command to the tag, or by way of a message using the secondary communication link.

Furthermore, if a tag fails to receive an expected message formatted in accordance with ACK message format 550, after allowing a predetermined timeout period that may be used to resolve potential collisions in ACKs as described below, the tag may infer that it is out-of-network, and may consequently change or adjust its operating mode. A change in operating mode by the tag may include, for instance, reducing its power consumption by reducing its reporting rate and/or ping rate until it begins again to receive messages formatted in accordance with ACK message format 550. The ping may be used by the tag to probe for a network response in order to learn the characteristics of the network that the tag is located within.

In some embodiments in accordance with the present invention, a beacon may be transmitted by one or more APs. The beacon may be a periodic signal used by some tags as a coarse timing indication. In some communication modes, a coarse timing indication may be adequate. For example, a tag may require relatively little energy to power some communication modes, and therefore the energy savings available from de-powering the circuitry during certain periods of time between beacons may not justify a highly accurate timing reference.

In some embodiments in accordance with the present invention, a "Super Synch" may be provided. The Super Synch may be used to provide enhanced (i.e., highly accurate) relative time synchronization of a group of end devices (i.e., tags and/or exciters) that are in close proximity to one another. When operating in a Super Synch mode, the APs emit during specified periodic times a beacon that allows super synchronization by members of the group of end devices. Super synchronization allows a group of end devices to synchronize within a fraction of a microsecond based on receiving the same signal by the different elements in the group. The actual absolute clock may not be as accurate compared to system time, but the relative synchronization between the end devices will be highly accurate.

When operating in a Super Synch mode, the transmission times of the beacons need not be highly accurate. A listen before talk protocol having a timing tolerance to within a few tens of milliseconds is acceptable since the power required for listening for the beacons is substantially less than power consumed by transmissions.

In some embodiments in accordance with the present invention, a super synch signal may be transmitted by way of a frequency modulated or phase modulated signal. A phase comparator or frequency comparator may be used to adjust the phase of an end device's local clock to within a fraction of a period of signal modulation on the RF signal.

Some embodiments in accordance with the present invention may implement group commands. A group command may be known as a command to a group of tags, such that members of the group may receive a communication without the need to assign an IP address to each tag, and without the use of TCP/IP communication to each tag. For example, the communication may include a command to enable some functionality of the tag. The Network Control System ("NCS") or equivalent may communicate group commands to the AP, which in turn can be transmitted to members of the group of tags based upon when the individual tag requests synchronization. In some embodiments, some instances of a tag request for synchronization may be primarily motivated in order to receive commands rather than to synchronize timing. Groups may be defined by a user and may be implemented by the ACK packet.

Some embodiments in accordance with the present invention may implement a wireless upgrade capability, e.g., an upgraded version of firmware for the tag in order to improve the support of the wireless communication capability of the tag. Such an upgrade capability may be done using a relatively small number of packets. An ACK response from the AP may be used to announce to the tags of an availability of new software code. Tags that will receive the new software may send one or more ECCX signals requesting the wireless upgrade code.

Figure 6:
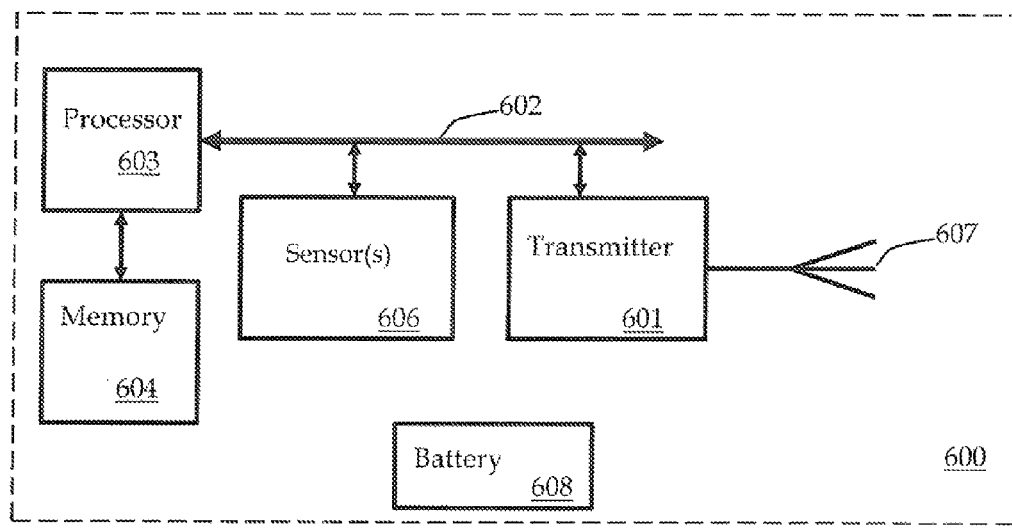
FIG. 6 is a diagram depicting at a high level of abstraction a measurement sensor tag in accordance with an embodiment of the present invention.

FIG. 6 illustrates at a high level of abstraction a block diagram of a tag 600 in accordance with an embodiment of the present invention. Tag 600 includes a transmitter 601, which may function as, e.g., a Wi-Fi communication interface at physical and data link layers. Transmitter 601 may be communicatively coupled via data bus 602 with processor 603. Processor 603 is communicatively coupled with memory 604. Memory 604 may be configured to store data (including a circular memory of sensor readings), configuration settings, and the like, and to store instructions that, when performed by processor 603, cause tag 600 to perform functions described herein. Tag 600 may further include one or more sensors 606. Sensors 606 may include sensors related to spatial position, temperature, humidity, orientation, motion sensing, light sensing, other environmental conditions, and so forth. Sensor 606 may be communicatively coupled via data bus 602 with processor 603. Transmitter 601 is coupled to antenna 607 for transmission of RF signals. A battery 608 is used to provide electrical power to components of tag 600. Persons of skill in the art will realize that the high-level depiction of FIG. 6 omits certain known features such as internal circuitry, battery charging interface, and so forth.

Figure 7:
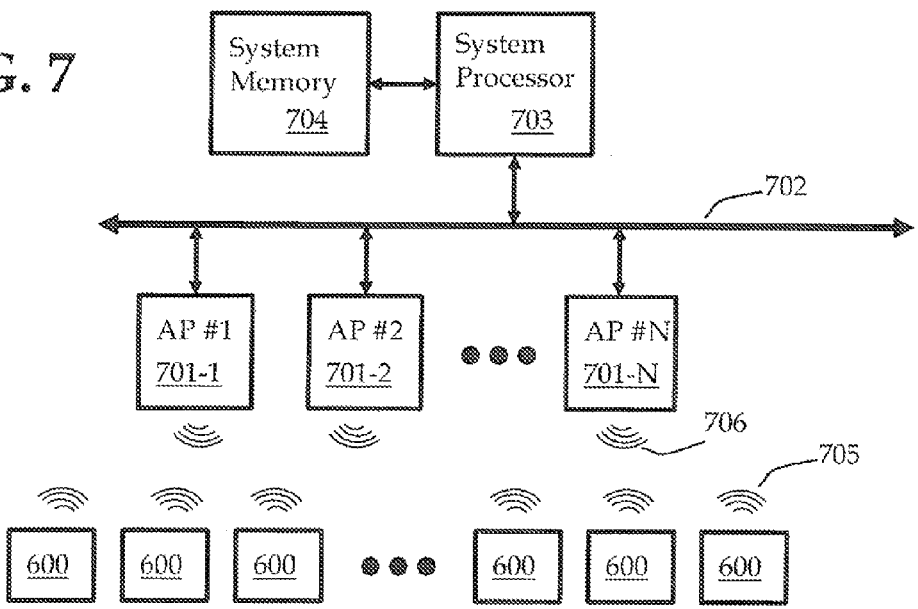
FIG. 7 is a diagram depicting at a high level of abstraction a system in accordance with an embodiment of the present invention.

FIG. 7 illustrates at a high level of abstraction a system 700 in accordance with an embodiment of the present invention. System 700 may include a system processor 703 coupled to a system memory 704. The system processor 703 is communicatively coupled to a plurality of access points 701-1 through 701-N, such as via a LAN 702. An individual but unspecified access point may be referred to herein as access point 701-$n$. The access points 701-1 through 701-N may be referred to herein as access points 701. System 700 further includes a plurality of tags 600. One or more of tags 600 may be communicatively coupled to at least one access point 701-$n$, such as by way of radio waves 705. System 700 is substantially single-directional in the direction indicated by radio waves 705. However, acknowledgment messages from access points 701 to one or more of tags 600 are an exception to the single-directional nature of system 700, and are transmitted to tags 600 by way of radio waves 706. An access point 701-$n$ and a tag 600 may also be communicatively coupled by way of a secondary communication technology (not illustrated in FIG. 7). The system memory 704 may be configured to store instructions that, when carried out by the system processor 703, may perform functions described herein. Optionally or additionally, an access point 701-$n$ may include a respective AP processor coupled to respective AP memory (not illustrated in FIG. 7). The AP memory may be configured to store instructions that, when carried out by the AP processor, may perform at least a portion of the functions described herein.

FIG. 8 illustrates a method 800 in accordance with an embodiment of the present invention. Method 800 is performed by a system like that of system 700, e.g., a system that is substantially single-directional in operation. Method 800 begins at step 802, at which an AP receives a request message from a tag for an ACK message from the AP. Optionally, the request message may include an ID of the AP or group of APs that should respond.

Next, control of method 800 passes to optional step 804, at which the AP and/or a processing system communicatively coupled to the AP interprets the message from the message from the tag, including any fields within the message that contain a request for additional information by the tag. Next, at step 806, the AP or a processing system coupled to the AP will formulate the ACK payload of an ACK message that will be transmitted to the tag. Next, control of method 800 passes to optional step 808, at which any additional information requested by the tag may be compiled. Next, control of method 800 passes to step 810, at which the AP transmits to the tag the ACK message, including the ACK payload and optionally any information that the tag requested.

Optionally, the ACK message may include a time reference supplied by a timing source.

Optionally, the ACK message may include a command to the tag or to a group of tags.

Optionally, the AP may measure the signal strength of the received signal from the tag. The AP may not respond to the request message unless the signal strength of the received signal exceeds a predetermined threshold value. In some embodiments, the threshold value may be specified by the tag as part of the request message.

Optionally, method 800 may include transmitting, by the access point, a beacon signal that is used by a plurality of active RFID tags in order to improve relative synchronization among the plurality of active RFID tags.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A wireless active RFID system, comprising:
 a plurality of access points, wherein each access point is groupable by a characteristic in common with another access point;
 a system controller communicatively coupled to a system memory and to the plurality of access points; and
 an active RFID tag, the tag comprising:
  a transmitter module configured to transmit, to access points in the system, request for an acknowledgement from any member of a predetermined group of access points, wherein where the acknowledgement comprises an information selected from a group consisting of:
   a time reference used by the system; and
   an identification of secondary technologies used by the system.

2. The system of claim 1, wherein where the active RFID system comprises a Real-Time Location System (RTLS).

3. The system of claim 1, wherein where the active RFID system further comprises a sensor to collect environmental data.

4. The system of claim 1, wherein the access point is configured to identify tags transmissions and to acknowledge tags transmissions directly without a need to access the system controller for each acknowledgement.

5. The system of claim 1, wherein the identification of communication channels and the identification of secondary technologies is stored within the access points.

6. The system of claim 1, wherein the time reference is supplied by a centralized time server upon request from an access point.

7. The system of claim 1, wherein the time reference is supplied to an access point by a push message from a centralized time server.

8. The system of claim 1, wherein an operational mode of the tag changes if the tag does not receive the acknowledgement within a predetermined period of time.

9. The system of claim 1, wherein the acknowledgement further comprises upgraded firmware for the tag.

10. The system of claim 1, wherein access points are groupable by frequency channel used by the respective access points.

11. The system of claim 10, wherein the frequency channel is in accordance with the IEEE 802.11 protocol.

12. The system of claim 10, wherein the frequency channel used by access points comprise a set of channels that do not overlap in frequency.

13. The system of claim 1, wherein access points are groupable by a reusable access point identification value, wherein the reusable identification value is assigned in order to maximize a minimum wireless distance between access points that share an identification.

14. The system of claim 1, wherein the predetermined group of access points comprises a group having a received signal strength that exceeds a predetermined minimum value of signal strength.

15. The system of claim 14, wherein the transmitter module of the tag is further configured to transmit to an access point the predetermined minimum value of signal strength, wherein the transmitted minimum value of signal strength is determined by the tag based upon a previous failed attempt to receive an acknowledgement.

16. The system of claim 14, wherein the predetermined minimum value of signal strength comprises a value that is determined by a number of consecutive requests for acknowledgement received from a tag.

17. The system of claim 1, wherein the active RFID tag is configured to perform a collision avoidance process upon a failed attempt by the active RFID tag to receive an acknowledgement from an access point.

18. The system of claim 1, further comprising a beacon configured to transmit a beacon signal to one or more tags during a predetermined period of time, wherein a transmission period of time of a tag is determined by receipt of the beacon signal.

19. The system of claim 1, further comprising a beacon configured to transmit a beacon signal to one or more tags, wherein the tags are configured to improve relative synchronization among the tags based upon the beacon signal.

20. The system of claim 1, wherein the acknowledgement further comprises a command to a predetermined tag.

21. The system of claim 1, wherein the acknowledgement further comprises a command to a plurality of tags.

22. An active RFID tag, comprising:
 a position sensor configured to provide a present measurement of a position of the active RFID tag; and
 a transmitter module configured to transmit to an access point: the present measurement of the position of the active RFID tag; and a request for an acknowledgement from a member of a predetermined group of access points,
 wherein the tag is configured to change an operational mode of the tag if the tag does not receive the acknowledgement within a predetermined period of time.

23. The tag of claim 22, wherein the transmitter module of the tag is further configured to transmit to an access point a predetermined minimum value of signal strength, wherein the transmitted minimum value of signal strength is determined by the tag based upon a previous failed attempt to receive an acknowledgement.

24. The tag of claim 22, wherein the tag is configured to improve relative synchronization with another tag based upon receipt of a beacon signal.

25. A method of operating a sensor system, comprising the steps of:
 receiving, by an access point of a communication system, a request message from an active RFID tag for an acknowledgment message, wherein the communication system is substantially single-directional from the RFID tag to the access point;

formulating an acknowledgment message in response to the request message, wherein the acknowledgment message further comprises a time reference supplied by a timing server; and transmitting the acknowledgment message from the access point to the active RFID tag.

26. The method claim 25, further comprising the steps of:
interpreting, by a processor, one or more requests for additional information in the request message from the active RFID tag;

compiling, by a processor, the additional information requested by the active RFID tag; and transmitting the additional information with the acknowledgment message to the active RFID tag.

27. The method claim 25, further comprising the steps of:
by a processor, interpreting in the request message an identification of an access point that should provide the acknowledgment; and transmitting the acknowledgment message by the access point only if the identification of the access point matches the identification in the request message from the active RFID tag.

28. The method claim 25, wherein the acknowledgment message further comprises a command to the active RFID tag.

29. The method claim 25, wherein the acknowledgment message further comprises a command to a group of active RFID tags.

30. The method claim 25, further comprising the steps of:
by a processor, measuring a received signal strength of the request message; and transmitting the acknowledgment message by the access point only if the received signal strength exceeds a predetermined received signal strength threshold value.

31. The method claim 30, further comprising the steps of: configuring the predetermined received signal strength threshold value based upon a message from the active RFID tag.

32. The method claim 25, further comprising the steps of: transmitting, by the access point, a beacon signal, wherein a plurality of active RFID tags are configured to improve relative synchronization among the plurality of active RFID tags based upon the beacon signal.

33. A wireless active RFID system, comprising:
a plurality of access points, wherein each access point is groupable by a characteristic in common with another access point;
a system controller communicatively coupled to a system memory and to the plurality of access points; and
an active RFID tag, the tag comprising:
a transmitter module configured to transmit, to access points in the system, request for an acknowledgement from any member of a predetermined group of access points,
wherein an operational mode of the tag changes if the tag does not receive the acknowledgement within a predetermined period of time.

34. The system of claim 33, wherein where the active RFID system comprises a Real-Time Location System (RTLS).

35. The system of claim 33, wherein where the active RFID system further comprises a sensor to collect environmental data.

36. The system of claim 33, wherein the acknowledgement further comprises upgraded firmware for the tag.

37. The system of claim 33, wherein access points are groupable by frequency channel used by the respective access points.

38. The system of claim 37, wherein the frequency channel is in accordance with the IEEE 802.11 protocol.

39. The system of claim 37, wherein the frequency channel used by access points comprise a set of channels that do not overlap in frequency.

40. The system of claim 33, wherein the predetermined group of access points comprises a group having a received signal strength that exceeds a predetermined minimum value of signal strength.

41. The system of claim 40, wherein the transmitter module of the tag is further configured to transmit to an access point the predetermined minimum value of signal strength, wherein the transmitted minimum value of signal strength is determined by the tag based upon a previous failed attempt to receive an acknowledgement.

42. The system of claim 40, wherein the predetermined minimum value of signal strength comprises a value that is determined by a number of consecutive requests for acknowledgement received from a tag.

43. The system of claim 33, wherein the active RFID tag is configured to perform a collision avoidance process upon a failed attempt by the active RFID tag to receive an acknowledgement from an access point.

44. The system of claim 33, further comprising a beacon configured to transmit a beacon signal to one or more tags during a predetermined period of time, wherein a transmission period of time of a tag is determined by receipt of the beacon signal.

45. The system of claim 33, further comprising a beacon configured to transmit a beacon signal to one or more tags, wherein the tags are configured to improve relative synchronization among the tags based upon the beacon signal.

46. The system of claim 33, wherein the acknowledgement further comprises a command to a predetermined tag.

47. The system of claim 33, wherein the acknowledgement further comprises a command to a plurality of tags.

48. A wireless active RFID system, comprising:
a plurality of access points, wherein each access point is groupable by a characteristic in common with another access point, and wherein access points are groupable by a reusable access point identification value, wherein the reusable identification value is assigned in order to maximize a minimum wireless distance between access points that share an identification;
a system controller communicatively coupled to a system memory and to the plurality of access points; and
an active RFID tag, the tag comprising:
a transmitter module configured to transmit, to access points in the system, request for an acknowledgement from any member of a predetermined group of access points.

49. The system of claim 48, wherein where the active RFID system comprises a Real-Time Location System (RTLS).

50. The system of claim 48, wherein where the active RFID system further comprises a sensor to collect environmental data.

51. The system of claim 48, wherein the acknowledgement further comprises upgraded firmware for the tag.

52. The system of claim 48, wherein access points are groupable by frequency channel used by the respective access points.

53. The system of claim 52, wherein the frequency channel is in accordance with the IEEE 802.11 protocol.

54. The system of claim 52, wherein the frequency channel used by access points comprise a set of channels that do not overlap in frequency.

55. The system of claim 48, wherein the predetermined group of access points comprises a group having a received signal strength that exceeds a predetermined minimum value of signal strength.

56. The system of claim 55, wherein the transmitter module of the tag is further configured to transmit to an access point the predetermined minimum value of signal strength, wherein the transmitted minimum value of signal strength is determined by the tag based upon a previous failed attempt to receive an acknowledgement.

57. The system of claim 55, wherein the predetermined minimum value of signal strength comprises a value that is determined by a number of consecutive requests for acknowledgement received from a tag.

58. The system of claim 48, wherein the active RFID tag is configured to perform a collision avoidance process upon a failed attempt by the active RFID tag to receive an acknowledgement from an access point.

59. The system of claim 48, further comprising a beacon configured to transmit a beacon signal to one or more tags during a predetermined period of time, wherein a transmission period of time of a tag is determined by receipt of the beacon signal.

60. The system of claim 48, further comprising a beacon configured to transmit a beacon signal to one or more tags, wherein the tags are configured to improve relative synchronization among the tags based upon the beacon signal.

61. The system of claim 48, wherein the acknowledgement further comprises a command to a predetermined tag.

62. The system of claim 48, wherein the acknowledgement further comprises a command to a plurality of tags.

63. A method of operating a sensor system, comprising the steps of:
receiving, by an access point of a communication system, a request message from an active RFID tag for an acknowledgment message, wherein the communication system is substantially single-directional from the RFID tag to the access point;
formulating an acknowledgment message in response to the request message; and
transmitting the acknowledgment message from the access point to the active RFID tag, wherein the active RFID tag is configured to change an operational mode of the active RFID tag if the active RFID tag does not receive the acknowledgement within a predetermined period of time.

64. The method claim 63, further comprising the steps of:
interpreting, by a processor, one or more requests for additional information in the request message from the active RFID tag;
compiling, by a processor, the additional information requested by the active RFID tag; and
transmitting the additional information with the acknowledgment message to the active RFID tag.

65. The method claim 63, further comprising the steps of:
by a processor, interpreting in the request message an identification of an access point that should provide the acknowledgment; and
transmitting the acknowledgment message by the access point only if the identification of the access point matches the identification in the request message from the active RFID tag.

66. The method claim 63, wherein the acknowledgment message further comprises a command to the active RFID tag.

67. The method claim 63, wherein the acknowledgment message further comprises a command to a group of active RFID tags.

68. The method claim 63, further comprising the steps of:
by a processor, measuring a received signal strength of the request message; and
transmitting the acknowledgment message by the access point only if the received signal strength exceeds a predetermined received signal strength threshold value.

69. The method claim 68, further comprising the steps of: configuring the predetermined received signal strength threshold value based upon a message from the active RFID tag.

70. The method claim 63, further comprising the steps of:
transmitting, by the access point, a beacon signal,
wherein a plurality of active RFID tags are configured to improve relative synchronization among the plurality of active RFID tags based upon the beacon signal.

71. A method of operating a sensor system, comprising the steps of:
receiving, by an access point of a communication system, a request message from an active RFID tag for an acknowledgment message, wherein the communication system is substantially single-directional from the RFID tag to the access point;
formulating an acknowledgment message in response to the request message, wherein where the acknowledgement comprises an information selected from a group consisting of:
a time reference used by the system; and
an identification of secondary technologies used by the system; and
transmitting the acknowledgment message from the access point to the active RFID tag.

72. The method claim 71, further comprising the steps of:
interpreting, by a processor, one or more requests for additional information in the request message from the active RFID tag;
compiling, by a processor, the additional information requested by the active RFID tag; and
transmitting the additional information with the acknowledgment message to the active RFID tag.

73. The method claim 71, further comprising the steps of:
by a processor, interpreting in the request message an identification of an access point that should provide the acknowledgment; and
transmitting the acknowledgment message by the access point only if the identification of the access point matches the identification in the request message from the active RFID tag.

74. The method claim 71, wherein the acknowledgment message further comprises a command to the active RFID tag.

75. The method claim 71, wherein the acknowledgment message further comprises a command to a group of active RFID tags.

76. The method claim 71, further comprising the steps of:
by a processor, measuring a received signal strength of the request message; and
transmitting the acknowledgment message by the access point only if the received signal strength exceeds a predetermined received signal strength threshold value.

77. The method claim 76, further comprising the steps of: configuring the predetermined received signal strength threshold value based upon a message from the active RFID tag.

78. The method claim 71, further comprising the steps of:
transmitting, by the access point, a beacon signal,
wherein a plurality of active RFID tags are configured to improve relative synchronization among the plurality of active RFID tags based upon the beacon signal.

* * * * *